(12) United States Patent
Reynolds et al.

(10) Patent No.: US 11,686,106 B2
(45) Date of Patent: Jun. 27, 2023

(54) DRYWALL FINISHING SYSTEM

(71) Applicants: Kevin Reynolds, Mogadore, OH (US); Anthony Romito, Mogadore, OH (US)

(72) Inventors: Kevin Reynolds, Mogadore, OH (US); Anthony Romito, Mogadore, OH (US)

(*) Notice: Subject to any disclaimer, the term of this patent is extended or adjusted under 35 U.S.C. 154(b) by 49 days.

(21) Appl. No.: 17/382,649

(22) Filed: Jul. 22, 2021

(65) Prior Publication Data

US 2022/0025661 A1  Jan. 27, 2022

Related U.S. Application Data

(60) Provisional application No. 63/054,965, filed on Jul. 22, 2020.

(51) Int. Cl.
*E04F 21/16* (2006.01)
*C09D 1/00* (2006.01)
*C09D 5/03* (2006.01)
*B65D 47/42* (2006.01)

(52) U.S. Cl.
CPC ............. *E04F 21/16* (2013.01); *B65D 47/42* (2013.01); *C09D 1/00* (2013.01); *C09D 5/035* (2013.01)

(58) Field of Classification Search
CPC ..... E04F 21/16; E04F 21/165; E04F 21/1652; E04F 21/1655; E04F 21/161; E04F 21/1667; C09D 5/03; C09D 5/033; C09D 5/037; C09D 5/035; C09D 1/00; A46B 47/42; A46B 47/44
USPC .................................................. 401/126–130
See application file for complete search history.

(56) References Cited

U.S. PATENT DOCUMENTS

| | | | | |
|---|---|---|---|---|
| 1,464,758 | A * | 8/1923 | Foster | A45D 33/006 132/307 |
| 6,398,440 | B1 * | 6/2002 | Hills | B05D 5/00 401/130 |
| 2002/0173597 | A1 * | 11/2002 | Zarnoch | C08L 71/12 525/461 |
| 2016/0257845 | A1 * | 9/2016 | Park | F16F 1/024 |

* cited by examiner

*Primary Examiner* — David J Walczak
(74) *Attorney, Agent, or Firm* — Brennan, Manna & Diamond, LLC

(57) ABSTRACT

An improved drywall finishing system is comprised of a container, a powdered compound and an applicator, and several methods of applying the compound to a drywall surface via the applicator. The first method of the system involves applying the compound to a drywall surface via the applicator to detect rough, un-sanded, or improperly sanded areas that can then be re-sanded as needed. Further, the second method of the system involves applying the compound to a drywall surface wherein the powder adheres to any high spots, low spots, or imperfections in the surface, wherein said spots can be re-sanded as needed.

17 Claims, 4 Drawing Sheets

DRYWALL FINISHING SYSTEM

CROSS-REFERENCE TO RELATED APPLICATION

The present application claims priority to, and the benefit of, U.S. Provisional Application No. 63/054,965, which was filed on Jul. 22, 2020 and is incorporated herein by reference in its entirety.

FIELD OF INVENTION

The present invention relates generally to the field of drywall finishing. More specifically, the present invention relates to an improved drywall finishing system. The drywall finishing system is comprised of a unique powdered compound, an applicator and several methods of applying the compound to a drywall surface via the applicator. The first method of the system involves applying the compound to a drywall surface via the applicator to both detect and highlight rough, un-sanded or improperly sanded areas that can then be re-sanded, as needed. The second method of the system involves applying the compound to a drywall surface, wherein the powder adheres to any high spots, low spots or other imperfections in the surface, and identifies the same so that said spots or imperfections can be re-sanded as needed. Accordingly, the present disclosure makes specific reference thereto. Nonetheless, it is to be appreciated that aspects of the present invention are also equally applicable to other like applications, devices and methods of manufacture.

BACKGROUND OF THE INVENTION

Drywall is typically installed by first anchoring one or more sheets of drywall to the interior frame of a structure. Next, a base coat of a drywall joint filling compound, or drywall "mud", is prepared and spread over any seams created by adjacent sheets of drywall and/or drywall screw or nail holes in the drywall. A paper or fiberglass tape is then applied to, or partially embedded in the case coat of compound or mud and is then smoothed over with a drywall taping knife or other suitable implement, as well as additional joint compound or drywall mud. After the mud or compound dries, the same is sanded with the goal of eliminating any high/low spots, imperfections and any evidence of the seams between adjacent sheets of drywall. If the goal is not accomplished, at least part of the above-referenced installation process may need to be performed again before the finished drywall is ready to be primed and painted.

Ideally, drywall mud should be sanded smooth, leaving the drywall surface without high or low spots that would affect or show through the drywall when finished (e.g. painted). Furthermore, defects in the surface of sanded drywall also affect the application of ceramic tile and other similar rigid or flexible materials/finishes which are applied over the drywall. Said defects are extremely difficult to identity with the naked eye, even under ideal lighting conditions which are rarely present on construction sites. Further, small defects that easily show through the paint finish on a drywall surface cannot be felt and identified by a worker's bare hand. In addition, contractors that attempt to reapply and re-sand drywall compound multiple times are still often unable to produce drywall surfaces that are satisfactory and contain no visible or functional defects such as high/low spots. Accordingly, because project budgets usually cannot economically justify the extra cost of refinishing drywall multiple times, customers must accept the defected finishes, which is neither acceptable nor desirable.

Therefore, there exists in the art a long-felt need for an improved drywall finishing system that aids a user in finishing drywall. Further, there exists a long-felt need in the art for an improved drywall finishing system that is comprised of a compound that can be easily applied to a drywall surface to aid in the sanding and finishing of the drywall via improved methods. In addition, there is a long-felt need in the art for an improved drywall finishing system that is comprised of a compound that aids a user in removing high spots, low spots, and other flaws in the surface of drywall via an improved method. Finally, there exists in the art a long-felt need for an improved drywall finishing system that is comprised of an applicator that allows a user to easily apply a drywall finishing compound to drywall, wherein the compound aids in the sanding/flaw correction of the drywall surface.

The present invention, in one exemplary embodiment, discloses an improved drywall finishing system. The system is comprised of a powdered drywall finishing compound, an applicator, and methods of applying the product to a drywall surface to detect surface flaws and to aid in sanding/finishing of a drywall surface. The compound of the system is preferably grey in color such that it can be easily identified once applied to a drywall surface. Accordingly, the compound can be applied to a drywall surface via the applicator to detect rough, un-sanded or improperly sanded areas that can then be re-sanded as needed. Further, the compound can be applied to a drywall surface wherein the powder adheres to any high spots, low spots, or imperfections in the surface such that they can be easily identified and corrected.

In this manner, the improved drywall finishing system of the present invention accomplishes all of the forgoing objectives based on long-felt needs in the art. Accordingly, the compound, applicator, and methods provide an efficient means to locate and refinish flawed drywall surfaces which may be un-sanded, improperly sanded or contain high/low spots or other flaws that could not be observed with the naked eye. Furthermore, this can be achieved using the low cost compound which is easy to clean to apply and use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises an improved drywall finishing system. The system is comprised of a powdered drywall finishing compound that can be applied to a drywall surface via an applicator using a method for flaw detection and/or a method for sanding/finishing drywall surfaces. As such, both methods greatly enhance the quality of the sanding and finishing of a drywall joint, ensuring that smooth, flat joints can be produced with significantly reduced sanding labor and time. To begin the sanding process method, a user first applies the grey-colored powder compound onto the surface of non-sanded or lightly sanded drywall joint via a sponge-like applicator located on the underside of the lid of a powdered compound container. Therefore, even in less than ideal lighting conditions, the thin coating of grey powder exposes flaws in the applied drywall compound/seam (such that they become visible to the human eye) and clings to the already applied joint compound. As such, the powder signals the location of flaws such as rough, un-sanded or improperly sanded areas via its grey color. Accordingly, said areas can then be re-sanded as needed until no grey color remains, thus signaling the absence of any improperly sanded areas.

Further, the powdered compound can also be used in a method to identify high and low spots or other flaws on a drywall surface. To begin the process, a user first applies the grey powder onto the surface of non-sanded or lightly sanded drywall joints via a sponge-like applicator located on the underside of the lid of the powder container. If applied to an unflawed drywall surface, the powder will simply slide off the face of the surface and onto the floor below the drywall sheet. However, if the powder adheres to and remains on the surface, this indicates the present of a high spot, low spot, or other flaw. Accordingly, said areas can then be re-sanded as appropriate until no grey powder remains, thus ensuring the area is free of flaws.

As a result, the compound can be used to detect roughness or imperfections in the surface of drywall that can barely be seen or felt by a worker. Further, the grey color of the compound remains clearly visible until flaws are sanded away, which will ensure all drywall joints are smooth, flat and ready for covering with final finishing products such as paint. In addition, the color of the gray powder is designed to be visible even to colorblind workers.

Accordingly, the system does not add any significant health risk hazard to the construction process, as dust masks are already mandated by drywall compound manufacturers. Further, the powdered compound creates minimal debris that can be easily cleaned. As such, the system allows drywall flaws to become visible even under poor lighting conditions which typically exist at construction sites. The compound of the system can also be used to detect surface flaws that cannot easily be seen of even felt by a worker, but which are eventually seen when the walls are painted.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an improved drywall finishing system. The system is comprised of a drywall finishing compound, an applicator and a plurality of methods of applying the compound using the applicator. The drywall finishing compound is preferably grey in color and is in a powdered form. The powder is stored within a container that further contains a sponge-like applicator brush within the lid of the container. The applicator can then be used to brush the compound onto a drywall surface via two methods. The first method relates to a sanding process method, wherein a user first applies the powder compound onto the surface of a non-sanded or lightly sanded drywall joint via the applicator. Accordingly, the grey powder exposes flaws in the applied drywall compound/seam (such that they are visible to the human eye) and clings to the already applied joint compound. Therefore, the powder signals the location of flaws such as rough, un-sanded or improperly sanded areas via its grey color. Said areas can then be re-sanded as appropriate until no grey color remains, thus signaling the absence of any improperly sanded areas.

Further, the powdered compound can also be used in a method to identify high and low spots or other flaws within the surface of the drywall. A user first applies the grey powder onto the surface of a non-sanded or lightly sanded drywall joint via the applicator. If applied to an unflawed drywall surface, the powder will simply slide off the face of the surface and onto the floor below the drywall surface. However, if the powder adheres to and remains on the surface, this indicates the present of a high spot, low spot or other flaw. Accordingly, said areas can then be re-sanded as appropriate until no grey powder remains, thus ensuring the area is free of flaws. As such, the compound, applicator, and methods of the system are designed to significantly improve the quality of drywall finishing, while substantially reducing time and labor costs associated with sanding the drywall joint filling, or applying patching compound.

Figure 1:
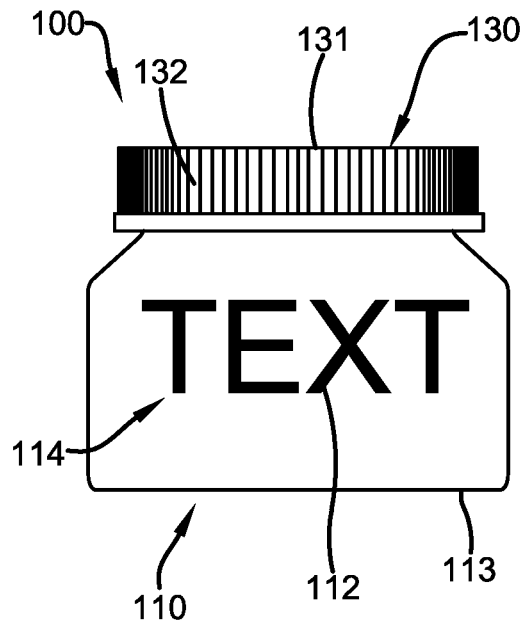
FIG. 1 illustrates a perspective view of one potential embodiment of a powder compound container and applicator device of the improved drywall finishing system of the present invention in a closed position in accordance with the disclosed architecture.

Referring initially to the drawings, FIG. 1 illustrates a perspective view of one potential embodiment of a compound container 110 and applicator 134 of the improved drywall finishing system 100 of the present invention in a closed position in accordance with the disclosed architecture. The container 110 is preferably comprised of a rounded body 112 and flat bottom surface 113. It is contemplated that the body 112 may be comprised of any durable material (e.g. metal, fiberglass, wood, etc.), but is preferably comprised of some form of durable, rigid plastic. Further, any surface of the body 112 may be comprised of a plurality of indica 114 including logos, wording, designs, etc. that may be in the form of a label or may be embossed, painted or printed onto the body 112 surface. The container 110 is preferably water-proof, but is at least moisture resistant.

Figure 2:
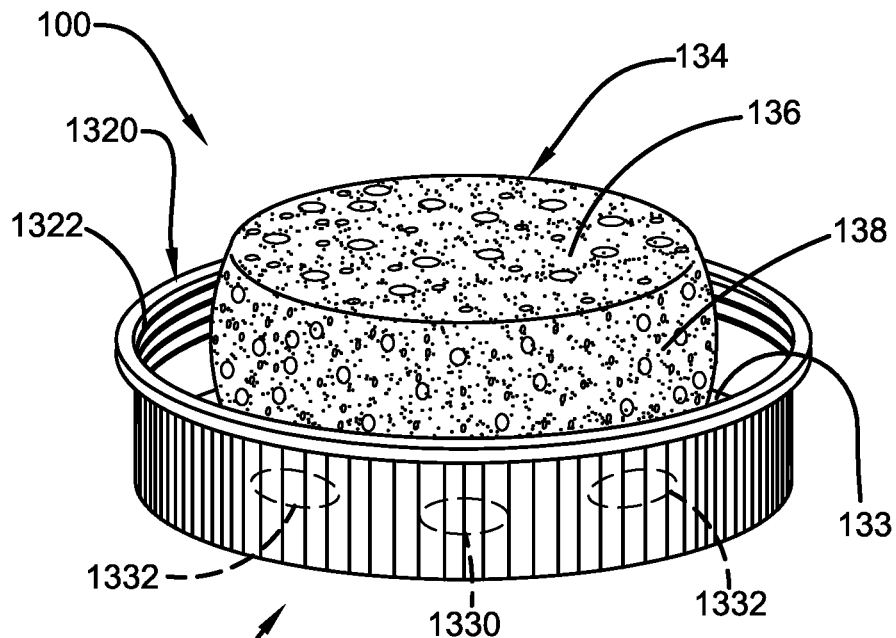
FIG. 2 illustrates a perspective view of one potential embodiment of an applicator lid of a compound container of the improved drywall finishing system of the present invention in accordance with the disclosed architecture.
Figure 3A:
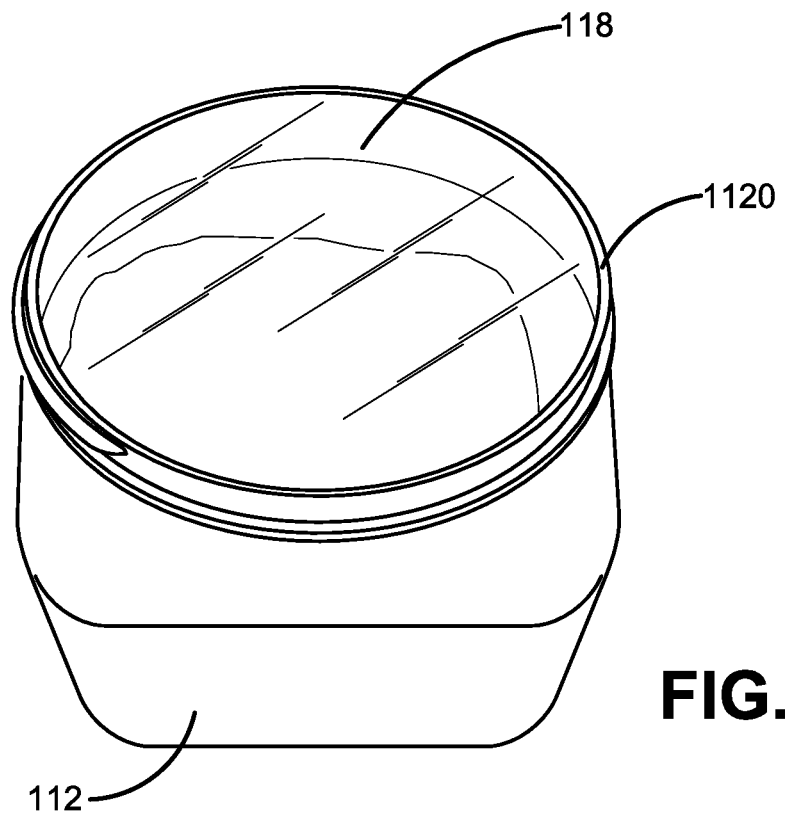
FIG. 3A illustrates a perspective view of one potential embodiment of a compound container and applicator device of the improved drywall finishing system of the present invention in an open position with an attached plastic membrane in accordance with the disclosed architecture.
Figure 3B:
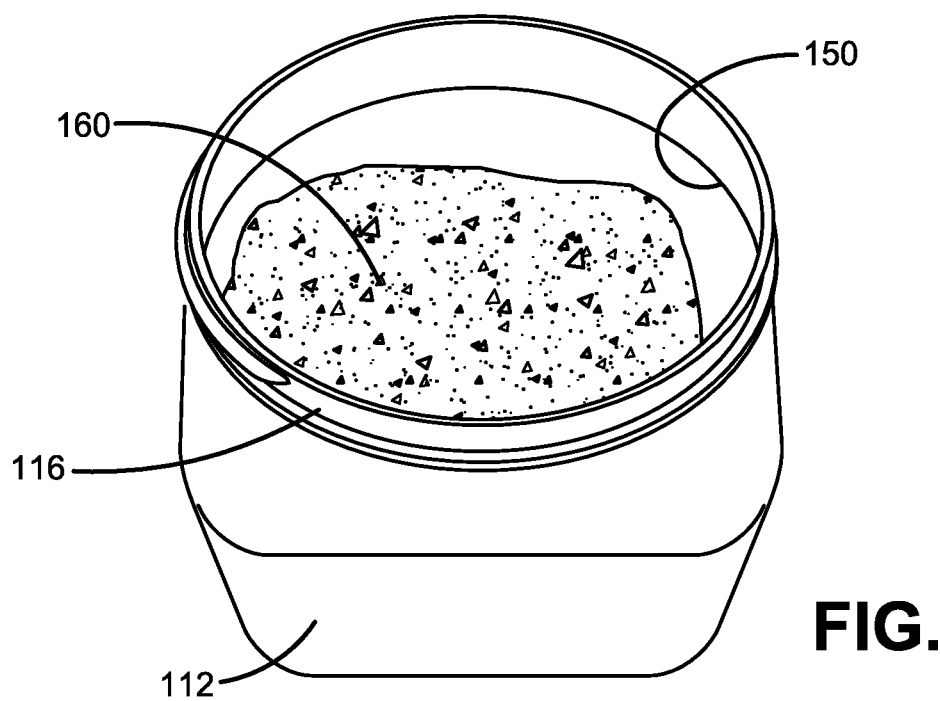
FIG. 3B illustrates a perspective view of one potential embodiment of a compound container and applicator device of the improved drywall finishing system of the present invention in an open position without an attached plastic membrane in accordance with the disclosed architecture.

The body 112 is also comprised of a round lid 130 with a flat top surface 131 and a circumferential side surface 132. As best seen in FIGS. 3A and 3B, the body 112 also contains a plurality of male threads 116 that engage female threads 1322 located on the interior 1320 of the side surface 132 of the lid 130 such that the lid 130 can be tightly secured to the body 112. The bottom surface 133 of the lid 130 is further comprised of a fixedly-attached applicator tool 134 that is comprised of a flat bottom surface 136 and a rounded side surface 138, as seen in FIG. 2. The applicator 134 is further preferably made of a sponge-like material that may be natural or artificial in differing embodiments of the applicator 134. It is also contemplated that the applicator 134 is fixedly attached to the bottom surface 133 via a permanent means such as adhesive. However, in some embodiments of the system 100 the applicator 134 may be removably attached to the bottom surface 133 by magnetic 1330 or hook and loop type fasteners 1332, which would allow the applicator 134 to be separated from the lid 130 for cleaning purposes. Alternatively, one embodiment of the lid 130 may also come with a kit that contains multiple, replaceable applicators 134.

The body 112 is also comprised of an interior cavity 150 (best shown in FIG. 3A) that stores a powdered compound 160, as shown in FIG. 3B. As will be stated further below, the compound 160 can be used to assist in finishing and sanding drywall joints to ensure a smooth and level finish, and can also be used to detect flaws within a drywall surface. The compound 160 is preferably grey in color, and is comprised of a limestone/calcium carbonate (CaCO3), a crystalline silica, a carbon black, a quartz and a around limestone. In a preferred embodiment of the present invention, the powdered compound 160 is comprised of between 95-97% of limestone/calcium carbonate (CaCO3) by weight, between 0.01-0.2% of crystalline silica by weight, between 0.1-1.5% of carbon black, between 1-4% of quartz and a balance of ground limestone. Nonetheless, differing embodiments of the compound 160 may utilize any combination of the above-referenced named ingredients in other ratios, by weight or volume. Further, the compound 160 may be any other color, and is not limited to grey.

The powdered compound 160 is preferably kept separately from the applicator 134 within the body 112 until it is ready for use by a flexible plastic membrane 118 that covers the opening of the interior cavity 150, as seen in FIG. 3A. The membrane 118 is preferably adhesively-attached to the top edge 1120 of the body 112 such that it can be easily peeled away from the top edge 1120 to allow the applicator 134 to fill with powder 160 to be used for sanding or flaw detection purposes, as will be explained more fully below. Further, it is contemplated that the membrane 118 may alternatively be comprised of any film-type such as but not limited to: transparent film, semi-transparent film, opaque film, metal-based films, paper-based films, etc.

Figure 4:
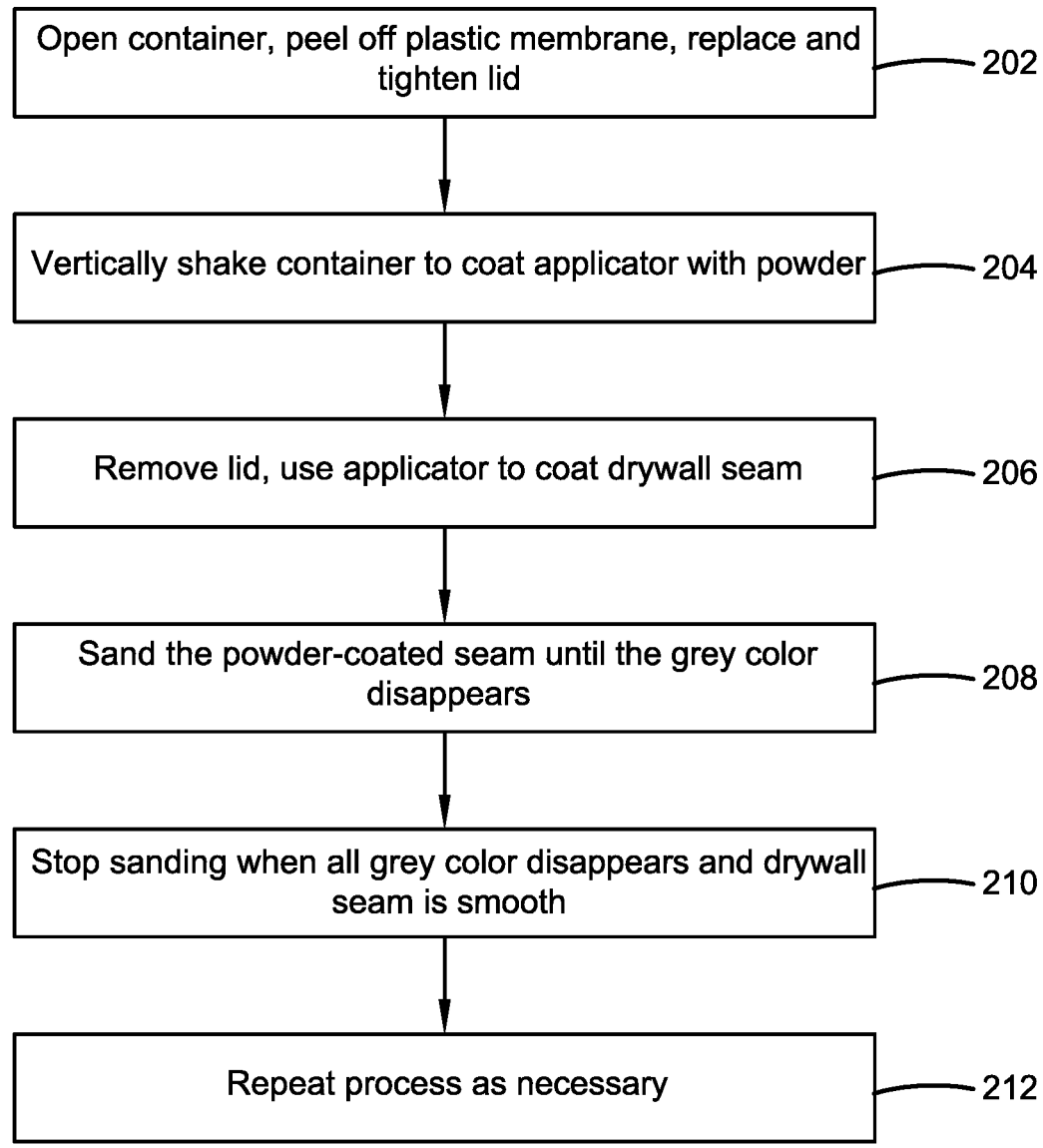
FIG. 4 illustrates a flow-chart diagram of one potential method of utilizing the improved drywall finishing system of the present invention in accordance with the disclosed architecture.
Figure 5:
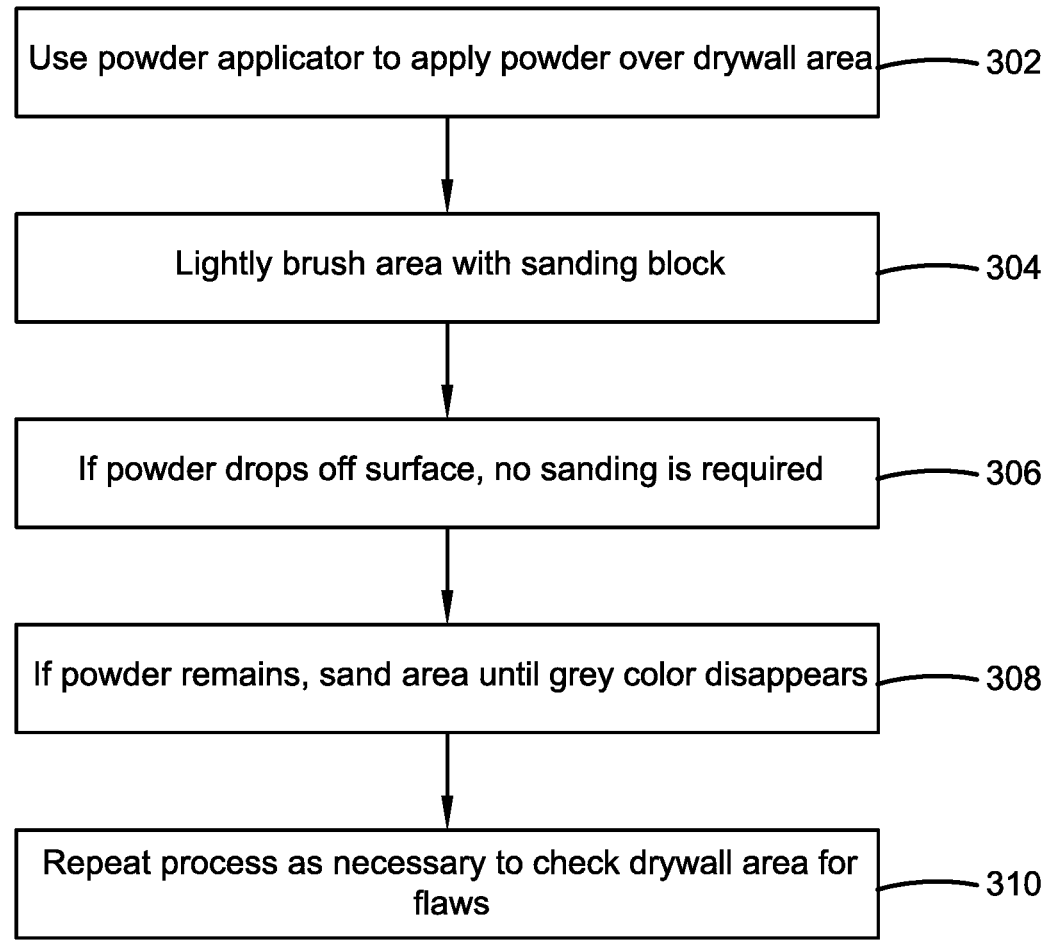
FIG. 5 illustrates a flow-chart diagram of another potential method of utilizing the improved drywall finishing system of the present invention in accordance with the disclosed architecture.

As noted, the compound 160 and applicator 134 of the system 100 can be used in a method 200 that assists a user in the sanding and finishing of drywall, as shown in the flow diagram in FIG. 4. To begin, a user first opens the container 110 and removes/peels the plastic membrane 118 off of the top edge 1120 and replaces and tightens the lid (202). Next, a user vertically shakes the container 110 in order to saturate the applicator 134 with the powdered compound 160 (204). Once saturated, a user can then remove the lid 130 and use the applicator 134 to brush powder 160 onto a drywall seam or surface that was been prepped via light sanding (206). After applying the powder 160, a user can then sand the drywall seam with a sanding device until the grey color of the powder disappears from all surfaces of the drywall (208). This process can then be stopped once all grey color is no longer visible, indicate the absence of any un-sanded "rough spots" (210). Accordingly, this process can be repeated as needed to ensure the seam achieves a smooth and level finish that can be easily painted (212).

Additionally, the compound 160 and applicator 134 can be used in a method 300 to check for flaws in a drywall surface. After performing steps 202 and 204 from the previous method 200, a user may then use the applicator 134 to apply the compound 160 to a drywall seam or area (302). Then, the area can be lightly brushed with a sanding block (304). Next, if the compound 160 simply drops off the drywall surface then no additional sanding is needed, as the surface is level and free of flaws (306). However, if the compound remains on the surface (thus indicating a high/low spot or flaw) a user can simply sand the area until the grey color of the compound is gone (308). This process can then be repeated as necessary until all flaws have been eliminated from the surface (310). Further, it should be noted that deep visible flaws may require the application of drywall compound (of the type known in the art) before the sanding process.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "improved drywall finishing system" and "system" are interchangeable and refer to the improved drywall finishing system 100 of the present invention.

Notwithstanding the forgoing, the improved drywall finishing system 100 of the present invention and its various components can be of any suitable size and configuration as is known in the art without affecting the overall concept of the invention, provided that they accomplish the above-stated objectives. One of ordinary skill in the art will appreciate that the size, configuration, and material of the improved drywall finishing system 100 as shown in the FIGS. are for illustrative purposes only, and that many other sizes and shapes of the improved drywall finishing system 100 are well within the scope of the present disclosure. Although the components of the improved drywall finishing system 100 are important parameters for user convenience, the improved drywall finishing system 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A drywall finishing system comprising:
   a powdered compound;
   an applicator for receiving the powdered compound and applying the powdered compound onto a drywall surface;
      wherein the powdered compound consists of a calcium carbonate, a crystalline silica, a carbon black, a quartz and a ground limestone; and
      further wherein the calcium carbonate comprises between 95-97% of the powdered compound by weight.

2. The drywall finishing system of claim 1, wherein the crystalline silica comprises between 0.01-0.2% of the powdered compound by weight.

3. The drywall finishing system of claim 2, wherein the carbon black comprises between 0.1-1.5% of the powdered compound by weight.

4. The drywall finishing system of claim 3, wherein the quartz comprises between 1-4% of the powdered compound by weight.

5. The drywall finishing system of claim 1, wherein the powdered compound is applied to a drywall surface via the applicator in a powdered form.

6. A drywall finishing system comprising:
   a container having an interior space and a lid, wherein the container is moisture resistant;
   a powdered compound stored in the interior space;
   an applicator attached to an underside of the lid for receiving the powdered compound and applying the powdered compound onto a drywall seam between adjacent sheets of drywall; and
   further wherein the powdered compound comprises a calcium carbonate, a crystalline silica, a carbon black, a quartz and a ground limestone.

7. The drywall finishing system of claim 6, wherein the powdered compound is grey in color.

8. The drywall finishing system of claim 7 further comprising a plastic membrane that separates the powdered compound from the applicator.

9. The drywall finishing system of claim 6, wherein the calcium carbonate comprises between 95-97% of the powdered compound by weight.

10. The drywall finishing system of claim 9, wherein the crystalline silica comprises between 0.01-0.2% of the powdered compound by weight.

11. The drywall finishing system of claim 10, wherein the carbon black comprises between 0.1-1.5% of the powdered compound by weight.

12. The drywall finishing system of claim 11, wherein the quartz comprises between 1-4% of the powdered compound by weight.

13. The improved drywall finishing system of claim 6, wherein the container has a plurality of indica on a body surface of the container.

14. The improved drywall finishing system of claim 13, wherein the indica is comprised of logos, wording, or designs that may be in the form of a label or embossed, painted, or printed onto the body surface.

15. The improved drywall finishing system of claim 6, wherein the container has a plurality of male threads.

16. The improved drywall finishing system of claim 6, wherein the applicator is fixedly attached to the underside of the lid via adhesive.

17. A method of finishing a drywall seam, the method comprising the steps of:
   applying a powdered compound to the drywall seam, wherein the powdered compound is in a powdered form and is comprised of a color;
   wherein the powdered compound is comprised of a calcium carbonate, a crystalline silica, a carbon black, and a quartz;
   wherein the calcium carbonate comprises between 95-97% of the powdered compound by weight;
   further wherein the powdered compound is comprised of a balance of ground limestone;
   identifying a flaw in the drywall seam using the color of the powdered compound; and
   correcting said flaw by sanding said flaw or applying a joint compound thereto.

* * * * *